(12) United States Patent
Nez et al.

(10) Patent No.: US 11,893,475 B2
(45) Date of Patent: *Feb. 6, 2024

(54) NEURAL NETWORK ACCELERATOR WRITABLE MEMORY

(71) Applicant: EDGECORTIX INC., Tokyo (JP)

(72) Inventors: Nikolay Nez, Tokyo (JP); Hamid Reza Zohouri, Sunnyvale, CA (US); Oleg Khavin, Tokyo (JP); Antonio Tomas Nevado Vilchez, Tokyo (JP); Sakyasingha Dasgupta, Tokyo (JP)

(73) Assignee: EDGECORTIX INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,676

(22) Filed: Oct. 11, 2021

(65) Prior Publication Data

US 2022/0215236 A1    Jul. 7, 2022

Related U.S. Application Data

(63) Continuation of application No. 17/141,187, filed on Jan. 4, 2021, now Pat. No. 11,144,822.

(51) Int. Cl.
| | |
|---|---|
| *G01N 33/48* | (2006.01) |
| *G01N 33/50* | (2006.01) |
| *G06N 3/063* | (2023.01) |
| *G06F 12/02* | (2006.01) |

(Continued)

(52) U.S. Cl.
CPC ......... *G06N 3/063* (2013.01); *G06F 12/0238* (2013.01); *G06F 17/15* (2013.01); *G06N 5/04* (2013.01)

(58) Field of Classification Search
CPC ............................ G06F 12/0238; G06F 17/15
See application file for complete search history.

(56) References Cited

U.S. PATENT DOCUMENTS

| | | |
|---|---|---|
| 11,144,822 B1 | 10/2021 | Nez et al. |
| 2017/0103313 A1 | 4/2017 | Ross et al. |

(Continued)

FOREIGN PATENT DOCUMENTS

CN    102508816 B    5/2014

OTHER PUBLICATIONS

Yu-Hsin Chen at al. "Eyeriss v2: A Flexible Accelerator for Emerging Deep Neural Networks on Mobile Devices", IEEE Journal on Emerging and Selected Topics in Circuits and Systems, vol. 9, Apr. 11, 2019, pp. 1-17. 17pp.

(Continued)

*Primary Examiner* — Russell S Negin
(74) *Attorney, Agent, or Firm* — HAUPTMAN HAM, LLP

(57) ABSTRACT

Neural network inference may be performed by configuration of a device including an accumulation memory, a plurality of convolution modules configured to perform mathematical operations on input values, a plurality of adder modules configured to sum values output from the plurality of convolution modules, and a plurality of convolution output interconnects connecting the plurality of convolution modules, the plurality of adder modules, and the accumulation memory. The accumulation memory is an accumulation memory allocation of a writable memory block having a reconfigurable bank width, and each bank of the accumulation memory allocation is a virtual combination of consecutive banks of the writable memory block.

10 Claims, 12 Drawing Sheets

(51) Int. Cl.
    *G06F 17/15*     (2006.01)
    *G06N 5/04*     (2023.01)

(56) References Cited

U.S. PATENT DOCUMENTS

| | | |
|---|---|---|
| 2017/0323196 A1 | 11/2017 | Gibson et al. |
| 2018/0197079 A1 | 7/2018 | Dasgupta et al. |
| 2018/0315155 A1 | 11/2018 | Park et al. |
| 2019/0317770 A1 | 10/2019 | Sankaralingam et al. |
| 2020/0133672 A1 | 4/2020 | Balasubramanian et al. |
| 2020/0371964 A1 | 11/2020 | Bhoria et al. |
| 2021/0064234 A1* | 3/2021 | Zhang .................. G06F 9/5016 |

OTHER PUBLICATIONS

Artur Podobas et al. "A Survey on Coarse-Grained Reconfigurable Architectures From a Performance Perspective", IEEE Access, vol. 8, Jul. 27, 2020, pp. 149719-146743, 25pp.

Dongjoo Shin et al. "DNPU: An Energy-Efficient Deep-Learning Processor with Heterogeneous Multi-Core Architecture", IEEE Micro Sep./Oct. 2018, pp. 85-93, 9pp.

Yu-Hsin Chen et al. "Eyeriss: An Energy-Efficient Reconfigurable Accelerator for Deep Convolutional Neural Networks", IEEE Journal of Solid-State Circuits, 2016, pp. 1-12, 12pp.

Jinmook Lee et al. "UNPU: An Energy-Efficient Deep Neural Network Accelerator With Fully Variable Weight Bit Precision", IEEE Journal of Solid-State Circuits, 2018, pp. 1-13, 13pp.

Jiang et al. "Hardware/Software co-exploration of neural architectures" IEEE Transactions on Computer-Aided Design of Integrated Circuits and Systems, vol. 39, Nov. 10, 2020, pp. 4805-4815. 11pp.

International Search Report in PCT/US2022/011071, dated Mar. 17, 2022. 4pp.

Written Opinon in PCT/US2022/011071, dated Mar. 17, 2022. 10pp.

* cited by examiner

US 11,893,475 B2

NEURAL NETWORK ACCELERATOR WRITABLE MEMORY

CROSS-REFERENCE TO RELATED APPLICATIONS

The present application is a continuation application of U.S. patent application Ser. No. 17/141,187, filed on Jan. 4, 2021, the contents of which are hereby incorporated by reference herein in their entirety.

BACKGROUND

Technical Field

The present invention relates to neural network accelerator writable memory reconfigurability. More specifically, exemplary embodiments of the present invention relate to configuration and performance of inference using neural network accelerator writable memory reconfigurability.

Background

The cost of computational power is becoming cheaper as more and more computational resources become packed into chips, such as integrated circuits. However, the full computational power of given chip is not always utilized for every task. Therefore, in situations where a single chip is assigned multiple types of tasks, the chip may be designed with computational resources that accommodate the most resource-demanding among its tasks. That particular design may not be efficient for performance of the other tasks, and so there is potential for performance that is lost. This is particularly true for accelerator chips configured to perform different types of neural network inference.

SUMMARY

According to an aspect of the present invention, provided is a device including an accumulation memory, a plurality of convolution modules configured to perform mathematical operations on input values, a plurality of adder modules configured to sum values output from the plurality of convolution modules, and a plurality of convolution output interconnects connecting the plurality of convolution modules, the plurality of adder modules, and the accumulation memory. The accumulation memory is an accumulation memory allocation of a writable memory block having a reconfigurable bank width, and each bank of the accumulation memory allocation is a virtual combination of consecutive banks of the writable memory block.

According to another aspect of the present invention, provided is a non-transitory computer-readable medium having instructions stored thereon that are executable by a computer to cause the computer to perform operations including obtaining a neural network and a configuration of an integrated circuit, the integrated circuit including a plurality of convolution modules, a plurality of adder modules, an accumulation memory, and a convolution output interconnect control module configured to open and close convolution output interconnects among a plurality of convolution output interconnects connecting the plurality of convolution modules, the plurality of adder modules, and the accumulation memory, determining at least one convolution output connection scheme whereby each convolution module has no more than one open direct connection through the plurality of convolution output interconnects to the accumulation memory or one of the plurality of adder modules, and generating integrated circuit instructions for the integrated circuit to perform inference of the neural network, the instructions including an instruction for the convolution output interconnect control module to configure the plurality of convolution output interconnects according to the at least one convolution output connection scheme.

This aspect may also include the method performed by the processor executing the instructions of the computer program, and an apparatus that performs the method. The apparatus may include sections configured to perform the operations of the method.

According to yet another aspect of the present invention, provided is a non-transitory computer-readable medium having instructions stored thereon that are executable by an integrated circuit to cause the integrated circuit to perform operations including receiving an instruction to perform inference of a neural network, configuring a plurality of convolution output interconnects according to at least one convolution output connection scheme whereby each convolution module among a plurality of convolution modules has no more than one open direct connection through the plurality of convolution output interconnects to an accumulation memory or one of a plurality of adder modules, and performing inference of the neural network.

This aspect may also include the method performed by the processor executing the instructions of the computer program, and an apparatus that performs the method. The apparatus may include sections configured to perform the operations of the method.

The summary does not describe all necessary features of the embodiments of the present invention. The present invention may also be a sub-combination of the features described above.

DESCRIPTION OF EXEMPLARY EMBODIMENTS

Figure 1:
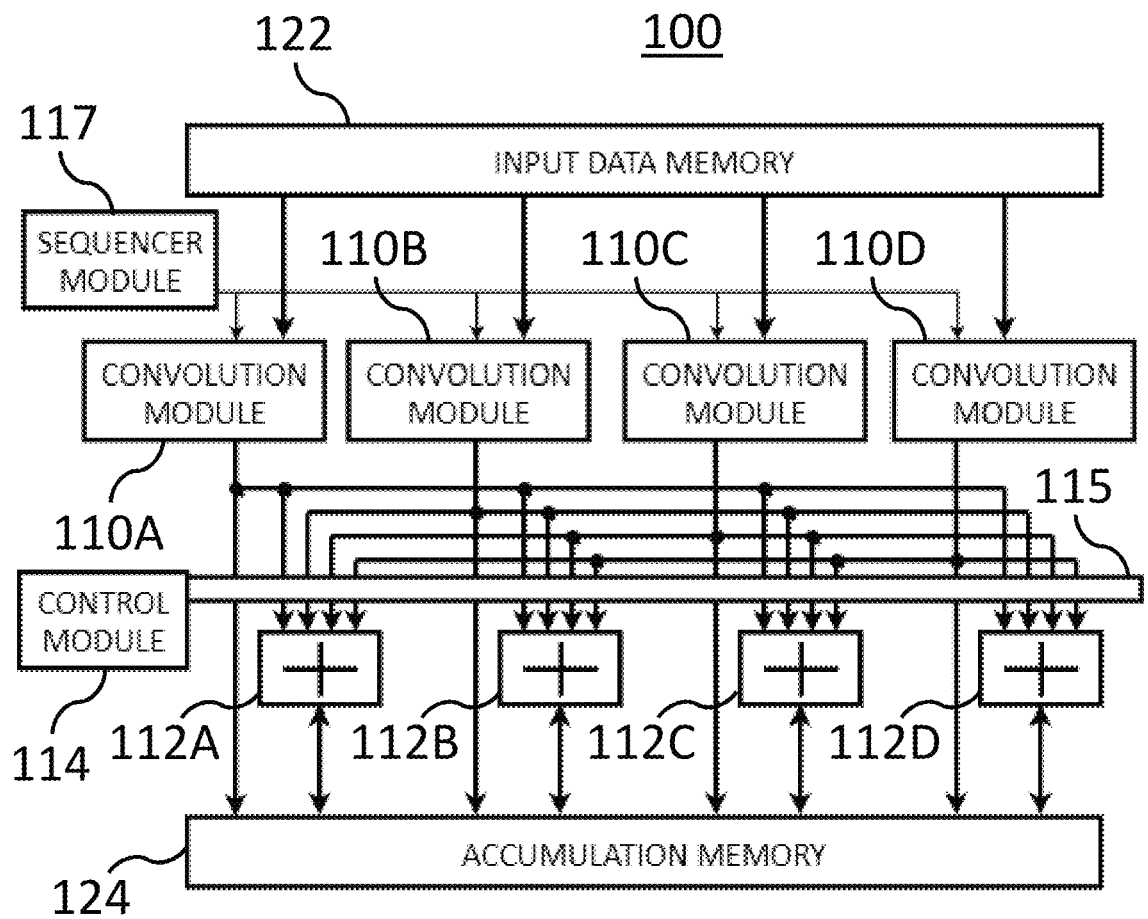
FIG. 1 shows a device for accelerator run-time reconfigurability, according to an embodiment of the present invention.

Hereinafter, example embodiments of the present invention will be described. The example embodiments shall not limit the invention according to the claims, and the combinations of the features described in the embodiments are not necessarily essential to the invention.

Various degrees of parallelism exist in performance of neural network inference, which can be exploited to increase computation efficiency. In particular, a simple task performed by a chip with many computational resources can utilize more of its resources through parallelism. However, the highest performance chips will have a fixed architecture optimized to take advantage of a limited number of the available degrees of parallelism, and will not be able to efficiently support all degrees of parallelism. Thus, performance of a simple task on a powerful chip may lead to low computational resource utilization, and low performance and power efficiency.

On the other hand, chips capable of complete architecture reconfiguration, such as field-programmable gate arrays (FPGAs), exist. Such chips are capable of being reconfigured for each specific task. However, the resources required to actually reconfigure such chips often exceed the resource savings in utilizing all computational resources during the task. Moreover, FPGAs provide high flexibility due to fine-grained reconfigurability, but this limits their peak compute performance compared to application-specific integrated circuits (ASICs) for a similar chip size.

Furthermore, there is a desire for reconfiguration of the architecture during performance of neural network inference. During inference, a layer of a neural network may be apportioned into "tiles" to accommodate an on-chip memory size of an accelerator chip. Multiple input tiles can be computed by compute modules in parallel, but this may only work efficiently for the first few layers where the size of the rows and columns is large.

Another theoretical way to utilize more compute modules is to compute multiple input channel tiles in parallel. However, this is usually not possible due to data dependency, i.e.—input values of one compute module computing a channel may be output values computed by another compute module computing another channel, requiring writing such output values to the on-chip memory, and then reading them again as input values.

Another theoretical way to utilize more compute modules is to compute multiple output channel tiles in parallel. However, this may be undesirable since input values and weight values may be 8-bit, but output values may be 32-bit, and therefore requires significantly more memory than other forms of parallelism.

To address these issues and desires, a device for performing neural network inference, such as an accelerator, may include a "reduction interconnect", between its compute modules and its on-chip memory for accumulating compute module outputs on-the-fly, avoiding the extra read from and write to on-chip memory. The reduction interconnect responds to "select" signals to establish connections between the compute modules, the on-chip memory, and anything between, in a manner that results in efficient run-time inference tasks or portions of such tasks.

For example, in an accelerator for inference of a convolutional neural network, the reduction interconnect may allow, for every convolution module, selecting between direct access to an accumulation memory or access through a particular adder.

The freedom to select the connectivity may allow an accelerator to compute multiple input channel tiles in parallel, provided that the convolutional modules are working fully synchronously, which may be established by having a single sequencer controlling all of the convolution modules involved in the task.

Individual connections of the reduction interconnect may be established in a circuit-switched manner before starting inference. In this case, "selection" signals may be used to control connectivity, resulting in "run-time reconfigurability".

FIG. 1 shows a device 100 for accelerator run-time reconfigurability, according to an embodiment of the present invention. Device 100 is an integrated circuit for performing neural network inference, such as an accelerator. Device 100 includes convolution modules 110A, 110B, 110C, and 110D, adder modules 112A, 112B, 112C, and 112D, a control module 114, a reduction interconnect 115, a sequencer module 117, an input data memory 122, and an accumulation memory 124.

Convolution modules 110A, 110B, 110C, and 110D are in communication with input data memory 122, and are each configured to perform mathematical operations on input values from input data memory 122, and weight values. Each convolution module may output values to one or more of adder modules 112A, 112B, 112C, and 112D or accumulation memory 124. Each convolution module may provide direct support for different parameters of mathematical operations, such as a kernel size of height (KH)×width (KW), vertical and horizontal strides, dilation, padding, etc. In some embodiments of device 100, convolution modules 110A, 110B, 110C, and 110D include at least one dedicated depth-wise convolution module and at least one point-wise convolution module. Other embodiments of device 100 include generic convolution modules, which may support combinations of depth-wise convolution and point-wise convolution layers, such as Inverted Residual Blocks in MobileNet-type neural networks.

Adder modules 112A, 112B, 112C, and 112D are connected to convolution modules 110A, 110B, 110C, and 110D through reduction interconnect 115, and each configured to sum values output from one or more of convolution modules 110A, 110B, 110C, and 110D. Each adder module may output resultant sums to accumulation memory 124. The input and output bit-width of adder modules may be any arbitrary value.

Control module 114 is in communication with reduction interconnect 115, and is configured to control reduction interconnect 115. Control module 114 is configured to open and close interconnects to direct the output of convolution modules 110A, 110B, 110C, and 110D. Control module 114 may control reduction interconnect 115 according to a scheme, such as a scheme designed to maximize the use of the computational resources of device 100 during inference of a neural network or certain layers within the neural network. In other words, control module 114 is configured to open and close convolution output interconnects according to a convolution output connection scheme whereby each convolution module has no more than one open direct connection through the plurality of convolution output interconnects to the accumulation memory or one of the plurality of adder modules.

Reduction interconnect 115 includes a plurality of interconnects arranged to allow a connection between each convolution module and accumulation memory 124, and between each convolution module and each adder. In other words, reduction interconnect 115 includes a plurality of convolution output interconnects connecting the plurality of convolution modules, the plurality of adder modules, and the accumulation memory, such that each convolution module has a direct connection to each adder module and the accumulation memory, and each adder module has a direct connection to the accumulation memory. These connections are not all open, but instead are mostly closed so that each convolution module has no more than one open direction connection. If a convolution module is not used in a certain scheme, then that convolution module may have no open direct connections through reduction interconnect 115.

Sequencer module 117 is in communication with each of convolution modules 110A, 110B, 110C, and 110D, and is configured to synchronize the operations of the plurality of convolution modules. For example, sequencer module 117 may synchronize each convolution module involved in the same computation, so that output values corresponding to the same input indices are generated at the same time by these convolution modules and forwarded to one of adder modules 112A, 112B, 112C, and 112D for accumulation.

Input data memory 122 is in communication with each of the plurality of convolution modules, and stores input values. Accumulation memory 124 is in communication with convolution modules 110A, 110B, 110C, and 110D and adder modules 112A, 112B, 112C, and 112D, and receives and stores values output therefrom. In this embodiment, input data memory 122 and accumulation memory 124 are both blocks of the on-chip memory of device 100. Each block of the on-chip memory includes a number of banks of a certain size. Each block may be organized as a set of one or two port memory banks. Each block may have read and write ports exposed to corresponding computation modules, load modules, and store modules.

In this embodiment, sequencer module 117 and control module 114 are separate. In some embodiments of a device for accelerator run-time reconfigurability, sequencer module 117 can perform functions of control module 114. Other embodiments will have one dedicated control module configured to perform the functions of both sequencer module 117 and control module 114. In some embodiments, the direct connections from the convolution modules to the accumulation memory may be outside of the reduction interconnect, and in further embodiments, may not be present at all, meaning that convolution modules only send data to adder modules.

Figure 2:
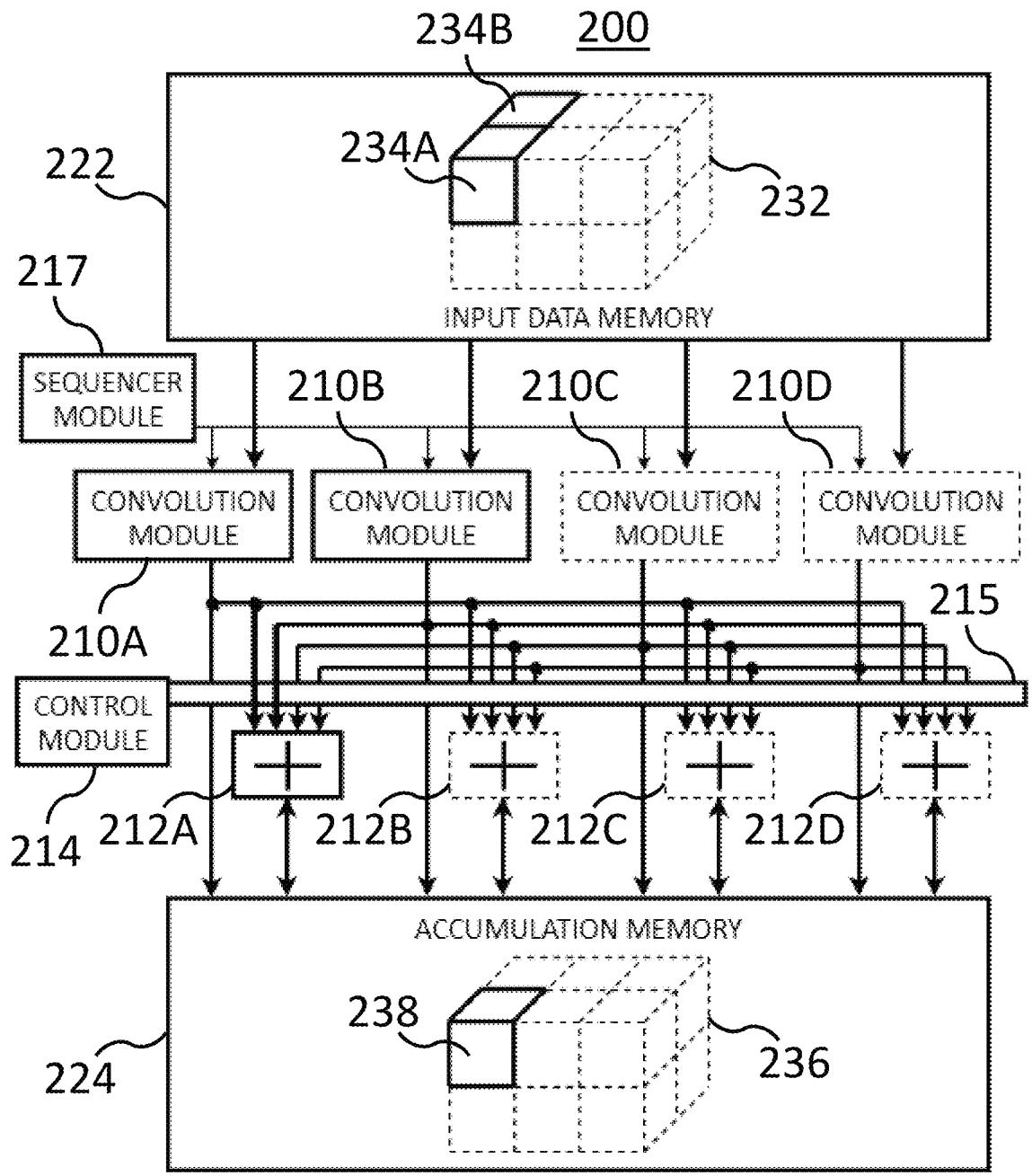
FIG. 2 shows a device configured according to a convolution output connection scheme, according to an embodiment of the present invention.

FIG. 2 shows a device 200 configured according to a convolution output connection scheme, according to an embodiment of the present invention. In this exemplary embodiment, device 200 includes convolution modules 210A, 210B, 210C, and 210D, adder modules 212A, 212B, 212C, and 212D, a control module 214, a reduction interconnect 215, a sequencer module 217, an input data memory 222, and an accumulation memory 224. Convolution modules 210A, 210B, 210C, and 210D, adder modules 212A, 212B, 212C, and 212D, control module 214, reduction interconnect 215, sequencer module 217, input data memory 222, and accumulation memory 224 have substantially the same structure and perform substantially the same function as convolution modules 110A, 110B, 110C, and 110D, adder modules 112A, 112B, 112C, and 112D, control module 114, reduction interconnect 115, sequencer module 117, input data memory 122, and accumulation memory 124 of FIG. 1, respectively, except where the description differs below.

The convolution output connection scheme in this embodiment includes more than one convolution module among the plurality of convolution modules having an open direct connection to a common adder module among the plurality of adder modules. More specifically, according to the convolution output connection scheme in this embodiment, convolution module 210A and convolution module 210B are directly connected to adder module 212A. Convolution module 210C and convolution module 210D are not connected to an adder module, and are therefore inactive. Adder module 212B, adder module 212C, and adder module 212D are not connected to a convolution module, and are therefore inactive.

Input data memory 222 is currently storing input values from tile 234A and 234B of neural network layer 232. These tiles span the channel dimension of the input. According to the convolution output connection scheme in this embodiment, the input values from tile 234A are computed by convolution module 210A while the input values from tile 234B are computed by convolution module 210B. Sequencer module 217 synchronizes the mathematical operations of convolution modules 210A and 210B so that values are output at the same time to be summed by adder module 212A. Once summed, adder module 212A outputs the resultant sum to accumulation memory 224. The resultant sums are values of tile 238 of neural network layer 236.

In the embodiments of FIGS. 1 and 2, the input data memory and the accumulation memory are separate memory blocks. This is because input values and accumulation values are different types of data, which have different requirements in terms of data width and total amount. The same may be true for other types of memory, such as weight memory. Because these memory blocks are separate, unused banks within them cannot be shared with other blocks.

The required memory size per data type varies across neural networks, and even for layers within a neural network, resulting in blocks of one memory type being underutilized while blocks of other memory type are fully, or overly utilized.

Data width may be different between different memory blocks, because each memory block has a data width matching the values the memory block is configured to store, which further complicates any effort to share unused banks.

To address these issues and desires, a device for performing neural network inference, such as an accelerator, may include a single writable memory block, capable of storing data of all types. Each memory will exist as an allocation on the single memory block. By utilizing a single memory block, unused memory banks may be shared, or reallocated to another memory. Therefore, a device may perform inference while utilizing a high proportion of memory, even for very different neural networks.

In order to accommodate values of different data widths, a least common denominator among data widths may be selected as the bank size. For a memory storing values that require larger data widths, consecutive memory banks may be virtually combined in the memory allocation. Bank size configuration and memory allocation may be performed during configuration or setup time of the device, which may be before inference is performed.

Figure 3:
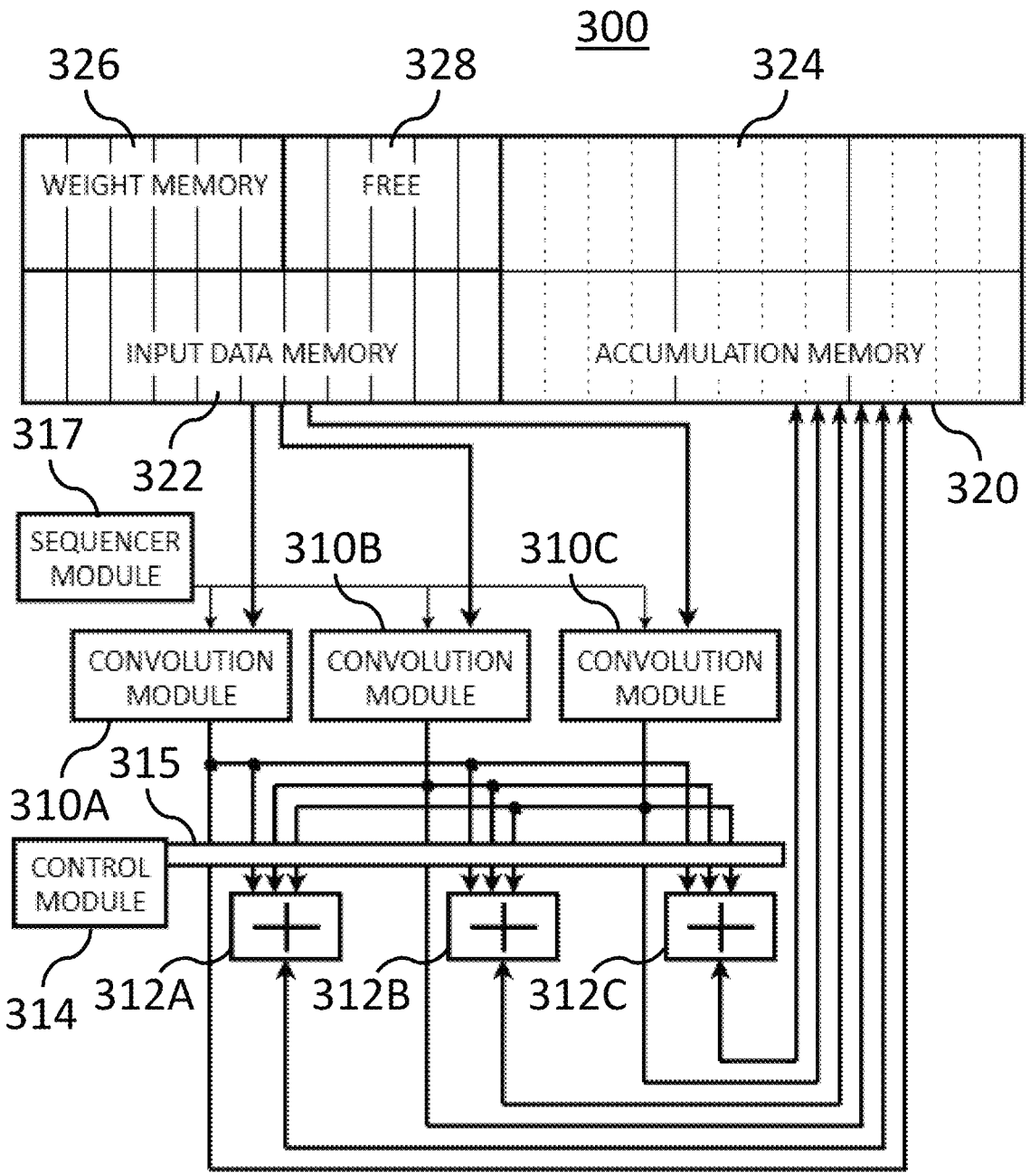
FIG. 3 shows a device for accelerator run-time reconfigurability having a reconfigurable writable memory, according to an embodiment of the present invention.

FIG. 3 shows a device 300 for accelerator run-time reconfigurability having a reconfigurable writable memory 320, according to an embodiment of the present invention. In this exemplary embodiment, device 300 includes convolution modules 310A, 310B, and 310C, adder modules 312A, 312B, and 312C, a control module 314, a reduction interconnect 315, a sequencer module 317, and writable memory block 320, which includes an input data memory allocation 322, an accumulation memory allocation 324, a weight memory allocation 326, and free memory 328. Convolution modules 310A, 310B, and 310C, adder modules 312A, 312B, and 312C, control module 314, reduction interconnect 315, sequencer module 317, input data memory allocation 322, and accumulation memory allocation 324 have substantially the same structure and perform substantially the same function as convolution modules 110A, 110B, and 110C, adder modules 112A, 112B, and 112C, control module 114, reduction interconnect 115, sequencer module 117, input data memory 122, and accumulation memory 124 of FIG. 1, respectively, except where the description differs below.

Writable memory block 320 is the only memory block in device 300, and includes a plurality of allocations, each allocation for a different memory. The accumulation memory of device 300 exists as accumulation memory allocation 324 of writable memory block 320. Writable memory block 320 further includes input data memory allocation 322. Input data memory allocation 322 stores input values. Writable memory block 320 has a reconfigurable bank width. Writable memory block 320 further includes weight memory allocation 326. Weight memory allocation 326 stores weight values.

In this embodiment, writable memory block 320 is configured for a bank width of 8 bits. Input data memory allocation 322 stores input data values, which are 8-bit values. Weight memory allocation 326 stores weight values, which are also 8-bit values. However, accumulation memory allocation 324 stores accumulation values, which are 32-bit values. In order to store 32-bit values in the 8-bit memory banks of writable memory block 320, accumulation memory allocation 324 includes 32-bit virtual banks, each virtual bank being a virtual combination of four consecutive 8-bit memory banks. In other words, each bank of accumulation memory allocation 324 is a virtual combination of consecutive banks of writable memory block 320.

Writable memory block 320 is in communication with convolution modules 310A, 310B, and 310C, in order to provide input data values and weight values for computation, and is further in communication with adder modules 312A, 312B, and 312C, in order to store accumulation values. Although shared lines of communication are shown from writable memory block 320 to convolution modules 310A, 310B, and 310C, separate lines of communication for input data and weight values may exist in other embodiments.

In other embodiments, the writable memory block may include allocations for any other memories for any other type of data, provided that the bank width is such that it can be multiplied to accommodate all data types of the device.

To further increase computational resource utilization, other degrees of parallelism can be utilized by considering the kernel row dimension. By adding a line buffer between the input data memory and the convolution modules, neural network inference can be performed with increased utilization of the multiple convolution modules. Another interconnect may be provided between the line buffer and the convolution modules to allow reconfigurable connections between indices of the line buffer and individual convolution modules. Each index of the line buffer corresponds to an index in the kernel row. This convolution input interconnect may establish which index of the line buffer is fed to which convolution module.

Figure 4:
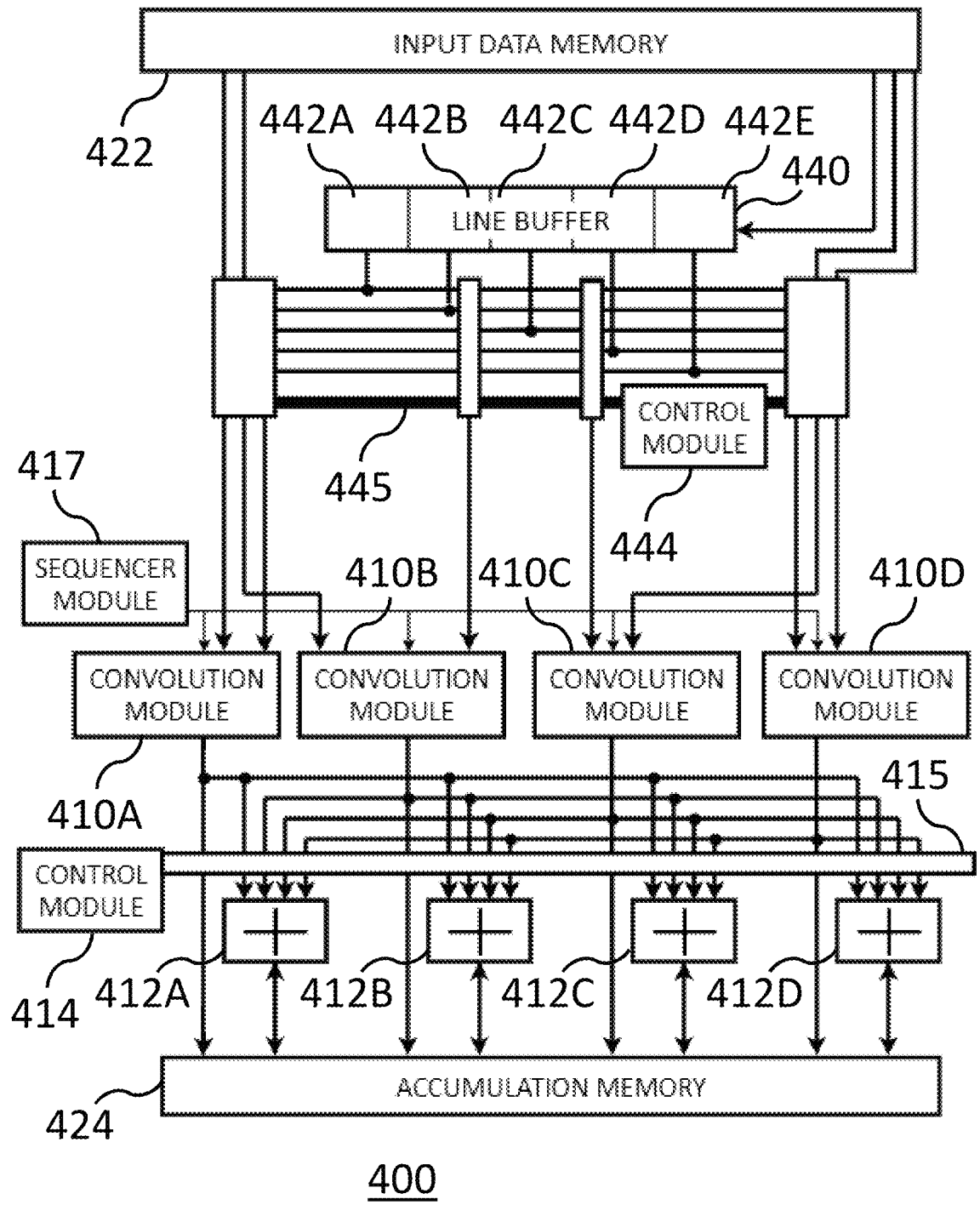
FIG. 4 shows another device for accelerator run-time reconfigurability, according to an embodiment of the present invention.

FIG. 4 shows another device 400 for accelerator run-time reconfigurability, according to an embodiment of the present invention. In this exemplary embodiment, device 400 includes convolution modules 410A, 410B, 410C, and 410D, adder modules 412A, 412B, 412C, and 412D, a control module 414, a reduction interconnect 415, a sequencer module 417, an input data memory 422, an accumulation memory 424, a line buffer 440, line buffer indices 442A, 442B, 442C, 442D, and 442E, a control module 444, and an interconnect 445. Convolution modules 410A, 410B, 410C, and 410D, adder modules 412A, 412B, 412C, and 412D, control module 414, interconnect 415, sequencer module 417, input data memory 422, accumulation memory 424 have substantially the same structure and perform substantially the same function as convolution modules 110A, 110B, 110C, and 110D, adder modules 112A, 112B, 112C, and 112D, control module 114, reduction interconnect 115, sequencer module 117, input data memory 122, and accumulation memory 124 of FIG. 1, respectively, except where the description differs below.

Although in this embodiment, input data memory 422 and accumulation memory 424 are shown similar to the memory blocks in FIGS. 1 and 2, input data memory 422 and accumulation memory 424 may be separate memory blocks, or may exist as allocations of a single writable memory block, such as single writable memory block 320 in FIG. 3.

Line buffer 440 is in communication with input data memory 442 and convolution modules 410A, 410B, 410C, and 410D. Line buffer indices 442A, 442B, 442C, 442D, and 442E are connected to convolution modules 410A, 410B, 410C, and 410D through interconnect 445. Line buffer 440 is configured to store input values corresponding to kernel indices as they are input to convolution modules 410A, 410B, 410C, and 410D.

Control module 444 is in communication with interconnect 445, and is configured to control interconnect 445. Control module 444 is configured to open and close interconnects to direct the input of convolution modules 410A, 410B, 410C, and 410D. Control module 444 may control interconnect 445 according to a scheme, such as a scheme designed to maximize the use of the computational resources of device 400 during inference of a neural network or certain layers within the neural network. In other words, control module 444 is configured to open and close convolution input interconnects according to a convolution input connection scheme whereby each convolution module has no more than one open direct connection through the plurality of convolution input interconnects to the input data memory or one of the plurality of indices.

Interconnect 445 includes a plurality of interconnects arranged to allow a connection between each convolution module and input data memory 424, and between each convolution module and each line buffer index. In other words, interconnect 445 includes a plurality of convolution input interconnects connecting the plurality of indices, the plurality of convolution modules, and the input data memory, such that each convolution module has a direct connection to each index and the input data memory. These connections are not all open, but instead are mostly closed so that each convolution module has no more than one open direction connection. If a convolution module is not used in a certain scheme, then that convolution module may have no open direct connections through interconnect 445. The connectivity between line buffer indices 442A, 442B, 442C, 442D, and 442E and convolution modules 410A, 410B, 410C, and 410D is substantially similar to the connectivity between the convolution modules 410A, 410B, 410C, and 410D and adder modules 412A, 412B, 412C, and 412D in that every module of each level has one connection to each module in the other level.

In this embodiment, there are separate control modules to control each interconnect. In other embodiments, a single control module may be used to control both interconnects 415 and 445. Each interconnect includes a plurality of individually controllable interconnects, and therefore may potentially receive a switching signal from a common source, an individual source, or multiple sources. In some embodiments, sequencer module 417 can perform the functions of control module 414 and control module 444. Other embodiments will have one dedicated control module configured to perform the functions of sequencer module 417, control module 414, and control module 444. In some embodiments, the direct connections from the convolution modules to the input data memory may be outside of the interconnect, and in further embodiments, may not be present at all, meaning that convolution modules only receive input data from the line buffer.

Figure 5:
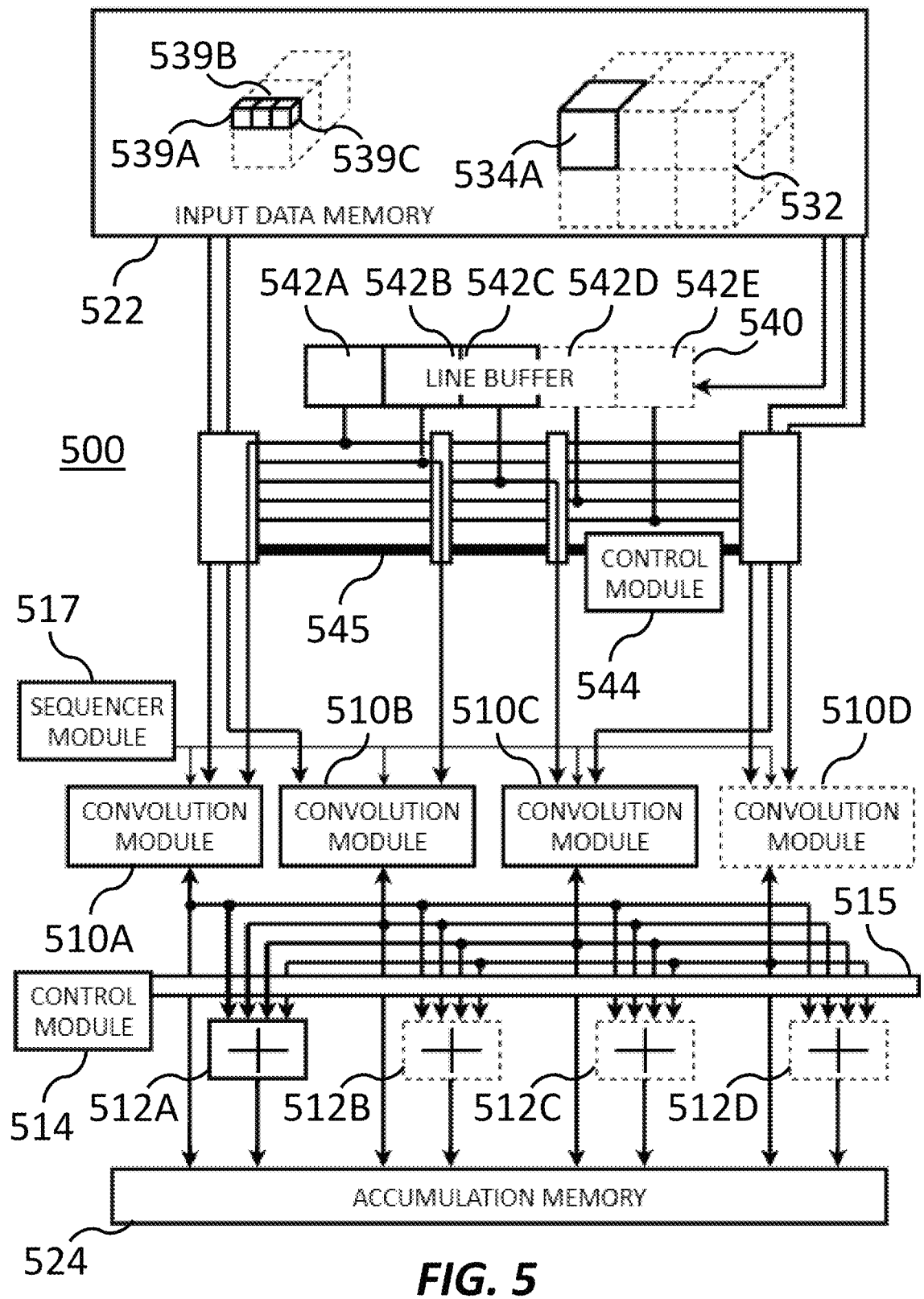
FIG. 5 shows a device configured according to a convolution output connection scheme and a convolution input connection scheme, according to an embodiment of the present invention.

FIG. 5 shows a device 500 configured according to a convolution output connection scheme and a convolution input connection scheme, according to an embodiment of the present invention. In this exemplary embodiment, device 500 includes convolution modules 510A, 510B, 510C, and 510D, adder modules 512A, 512B, 512C, and 512D, a control module 514, a reduction interconnect 515, a sequencer module 517, an input data memory 522, an accumulation memory 524, a line buffer 540, line buffer indices 542A, 542B, 542C, 542D, and 542E, a control module 544, and a interconnect 545. Convolution modules 510A, 510B, 510C, and 510D, adder modules 512A, 512B, 512C, and 512D, control module 514, reduction interconnect 515, sequencer module 517, input data memory 522, accumulation memory 524, line buffer 540, line buffer indices 542A, 542B, 542C, 542D, and 542E, control module 544, and interconnect 545 have substantially the same structure and perform substantially the same function as convolution modules 110A, 110B, 110C, and 110D, adder modules 112A, 112B, 112C, and 112D, control module 114, reduction interconnect 115, sequencer module 117, input data memory 122, and accumulation memory 124 of FIG. 1, and line buffer 440, line buffer indices 442A, 442B, 442C, 442D, and 442E, control module 444, and interconnect 445 of FIG. 4, respectively, except where the description differs below.

Although in this embodiment, input data memory 522 and accumulation memory 524 are shown similar to the memory blocks in FIGS. 1 and 2, input data memory 522 and accumulation memory 524 may be separate memory blocks, or may exist as allocations of a single writable memory block, such as single writable memory block 320 in FIG. 3.

According to the convolution input connection scheme in this embodiment, Line buffer index 542A is directly connected to convolution module 510A, line buffer index 542B is directly connected to convolution module 510B, and line buffer index 542C is directly connected to convolution module 510C. Line buffer index 542D and line buffer index 542E are not connected to a convolution module, and are therefore inactive. Convolution module 510D is not connected to a line buffer index, and is therefore inactive.

According to the convolution output connection scheme in this embodiment, convolution module 510A, convolution module 510B, and convolution module 510C are all directly connected to adder module 512A. Convolution module 510D is inactive, and therefore is also not connected to an adder module. Adder module 512B, adder module 512C, and adder module 512D are not connected to a convolution module, and are therefore inactive.

Input data memory 522 is currently storing input values from tile 534A of neural network layer 532. Line buffer is pre-loaded with 5 consecutive indexes of the input from input data memory 522. Inference of neural network layer 532 is performed using a kernel having a row width of 3 and a dilation factor of 1, meaning that a dot product operation is performed between input indexes 1, 2, and 3, and the kernel row values. The kernel row includes kernel indices 539A, 539B, and 539C. According to the convolution input connection scheme in this embodiment, the 1st input index is multiplied by the value of kernel index 539A for multiple input channels by convolution module 510A, the 2nd input index is multiplied by the value of kernel index 539B for multiple input channels by convolution module 510B, and the 3rd input index is multiplied by the value of kernel index 539C for multiple input channels by convolution module 510C. Once summed, adder module 512A outputs the resultant sum to accumulation memory 524. Then, line buffer 540 is shifted left, with the first input index being discarded, and the 6th input index being loaded from input data memory 522. In the next step, the process of multiplying input values by kernel row values is repeated, this time with input indexes 2, 3 and 4, and outputs are summed similarly, and line buffer 522 is shifted again until input tile 534A is processed completely.

Figure 6:
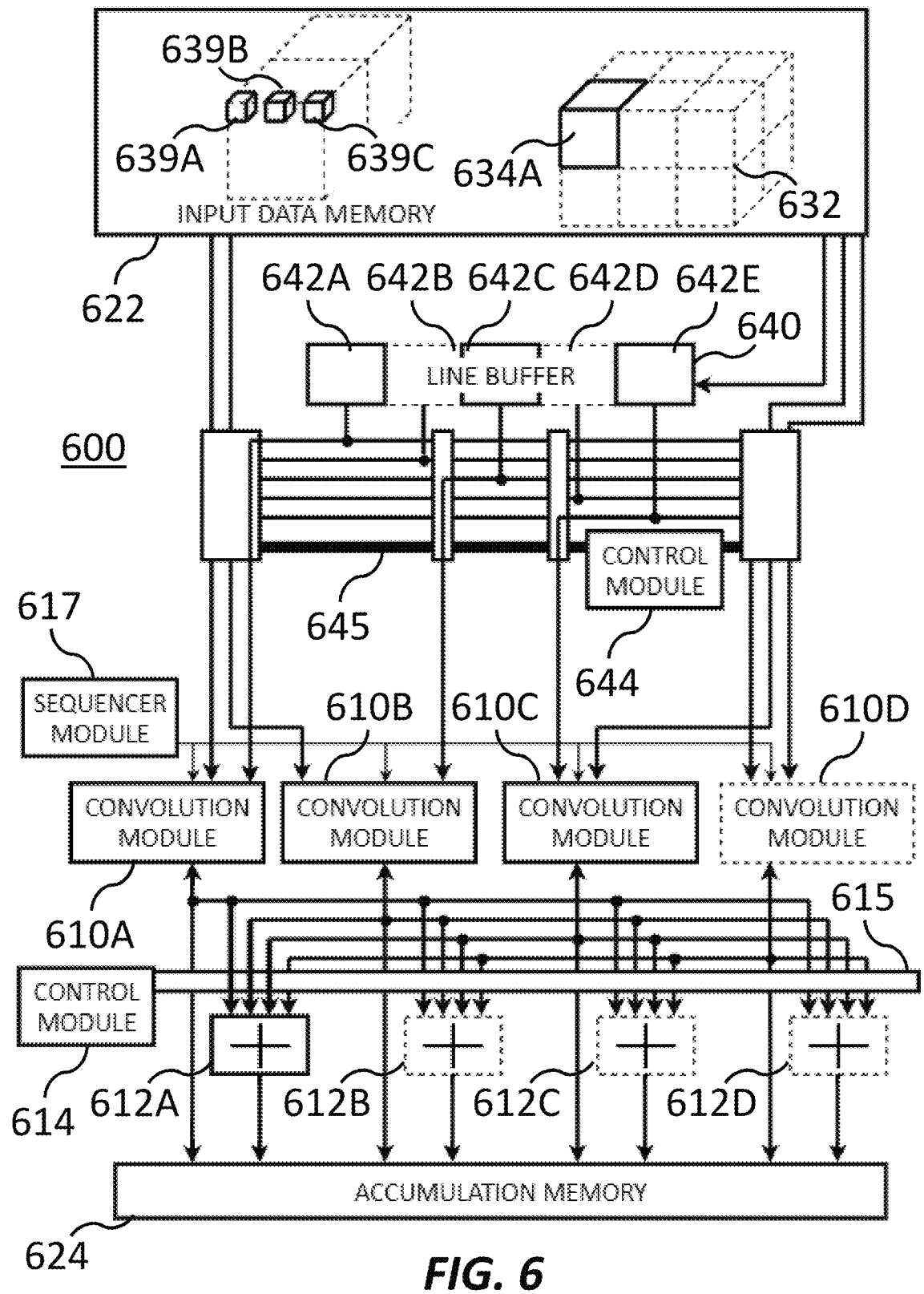
FIG. 6 shows a device configured according to a convolution output connection scheme and another convolution input connection scheme, according to an embodiment of the present invention.

FIG. 6 shows a device 600 configured according to a convolution output connection scheme and another convolution input connection scheme, according to an embodiment of the present invention. In this exemplary embodiment, device 600 includes convolution modules 610A, 610B, 610C, and 610D, adder modules 612A, 612B, 612C, and 612D, a control module 614, a reduction interconnect 615, a sequencer module 617, an input data memory 622, an accumulation memory 624, a line buffer 640, line buffer indices 642A, 642B, 642C, 642D, and 642E, a control module 644, and a interconnect 645. Convolution modules 610A, 610B, 610C, and 610D, adder modules 612A, 612B, 612C, and 612D, control module 614, reduction interconnect 615, sequencer module 617, input data memory 622, accumulation memory 624, line buffer 640, line buffer indices 642A, 642B, 642C, 642D, and 642E, control module 644, and interconnect 645 have substantially the same structure and perform substantially the same function as convolution modules 110A, 110B, 110C, and 110D, adder modules 112A, 112B, 112C, and 112D, control module 114, reduction interconnect 115, sequencer module 117, input data memory 122, and accumulation memory 124 of FIG. 1, and line buffer 440, line buffer indices 442A, 442B, 442C, 442D, and 442E, control module 444, and interconnect 445 of FIG. 4, respectively, except where the description differs below.

Although in this embodiment, input data memory 622 and accumulation memory 624 are shown similar to the memory blocks in FIGS. 1 and 2, input data memory 622 and accumulation memory 624 may be separate memory blocks, or may exist as allocations of a single writable memory block, such as single writable memory block 320 in FIG. 3.

According to the convolution input connection scheme in this embodiment, Line buffer index 642A is directly connected to convolution module 610A, line buffer index 642C is directly connected to convolution module 610B, and line buffer index 642E is directly connected to convolution module 610C. Line buffer index 642D and line buffer index 642E are not connected to a convolution module, and are therefore inactive during computation but are still used to hold input data. Convolution module 610D is not connected to a line buffer index, and is therefore inactive.

According to the convolution output connection scheme in this embodiment, convolution module 610A, convolution module 610B, and convolution module 610C are all directly connected to adder module 612A. Convolution module 610D is inactive, and therefore is also not connected to an adder module. Adder module 612B, adder module 612C, and adder module 612D are not connected to a convolution module, and are therefore inactive.

Input data memory 622 is currently storing input values from tile 634A of neural network layer 632. Line buffer is pre-loaded with 5 consecutive indexes of the input from input data memory 622. Inference of neural network layer 632 is performed using a kernel having a row width of 3 and a dilation factor of 2, meaning that a dot product operation is performed between input indexes 1, 3 and 5, values and the kernel row values. The kernel row includes kernel indices 639A, 639B, and 639C. According to the convolution input connection scheme in this embodiment, the 1st input index is multiplied by the value of kernel index 639A for multiple input channels by convolution module 610A, the 3rd input index is multiplied by the value of kernel index 639B for multiple input channels by convolution module 610B, and the 5th input index is multiplied by the value of kernel index 639C for multiple input channels by convolution module 610C. Once summed, adder module 612A outputs the resultant sum to accumulation memory 624. Then, line buffer 540 is shifted left, with the first input index being discarded, and the 6th input index being loaded from input data memory 622. In the next step, the process of multiplying input values by kernel row values is repeated, this time with input indexes 2, 4, and 6, and outputs are summed similarly, and line buffer 622 is shifted again until input tile 634A is processed completely.

Figure 7:
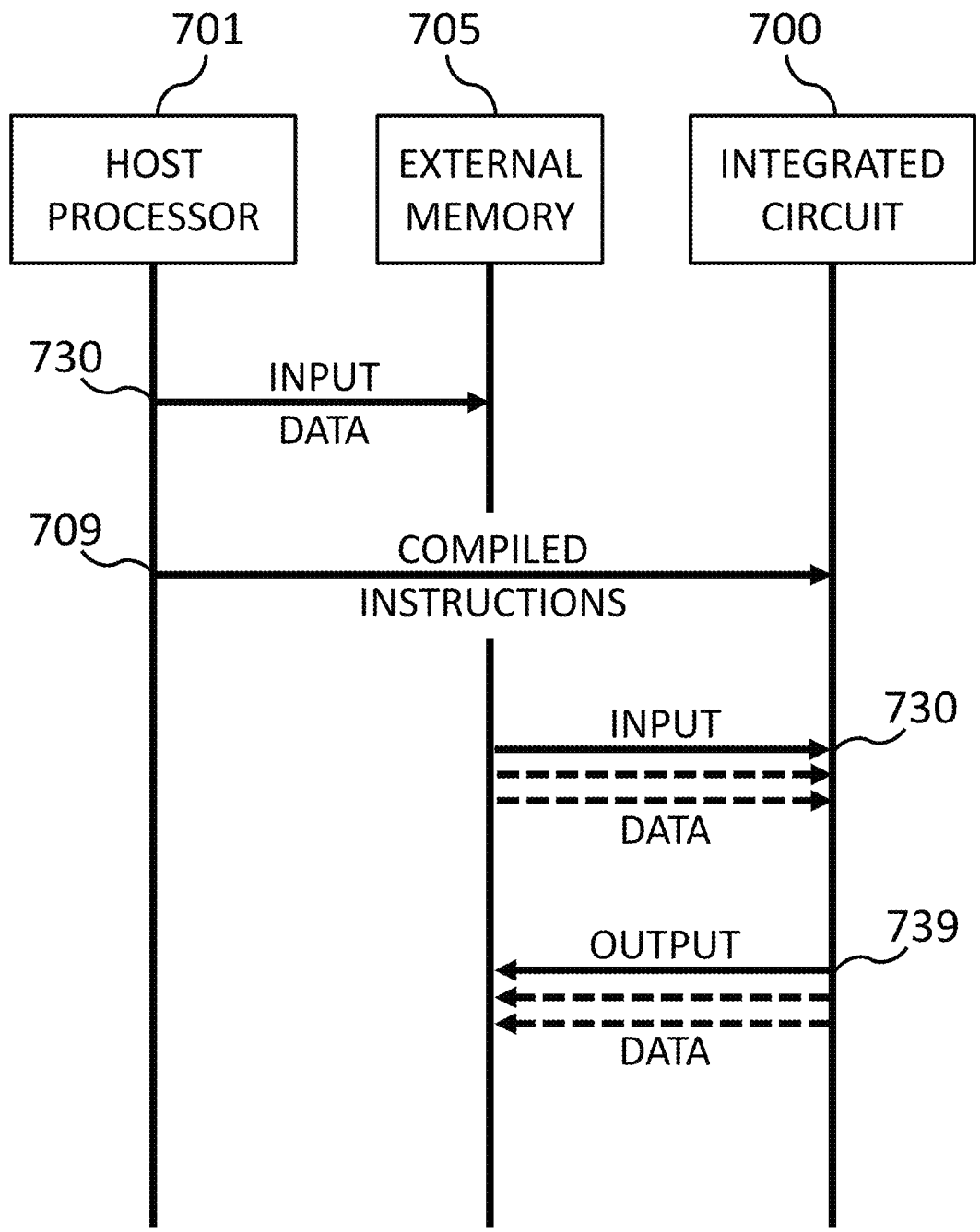
FIG. 7 shows a system for accelerator run-time reconfigurability, according to an embodiment of the present invention.

FIG. 7 shows a system for accelerator run-time reconfigurability, according to an embodiment of the present invention. The system includes host processor 701, external memory 705, and integrated circuit 700. Host processor 701 and integrated circuit 700 are in communication with external memory 705. Host processor 701 determines parameters and generates instructions for configuration of integrated circuit 700 for neural network inference and execution. Host processor 701 then writes input data 730 to external memory 705. Host processor 701 also compiles instructions that, when executed by integrated circuit 700, cause integrated circuit 700 to reconfigure and perform neural network inference. Host processor 701 transfers compiled instructions 709 to integrated circuit 700, and causes integrated circuit 700 to execute compiled instructions 709 to reconfigure and perform neural network inference. During inference, integrated circuit 700 reads input data 730 from external memory 705 in one or more portions, such as tiles. As values of output data 739 are computed by integrated circuit 700, integrated circuit writes output values 739 to external memory 705.

To facilitate accelerator run-time reconfigurability, instructions generated by a host processor will include one or more configuration operations in addition to the inference operations. This may be a reduction of instruction granularity compared to instructions for programmable devices, such as FPGAs, which take much more time for a single "setup" step, or non-configurable inference devices, such as typical ASICs, which may just have an "execute" step without any "setup" steps. Separate "setup" and "execute" steps may prevent instruction complexity from increasing with the number of convolution modules in a reconfigurable accelerator. During generation of the instructions, the host processor will determine how and in what order the convolution modules will be used in the performance of inference, and may further determine how a reconfigurable memory block of the accelerator will be allocated in order to be shared across different data types of different memories.

In other embodiments, the processor responsible for generating instructions and compilation can be separate from the host processor that sends the instructions to the integrated circuit.

Figure 8:
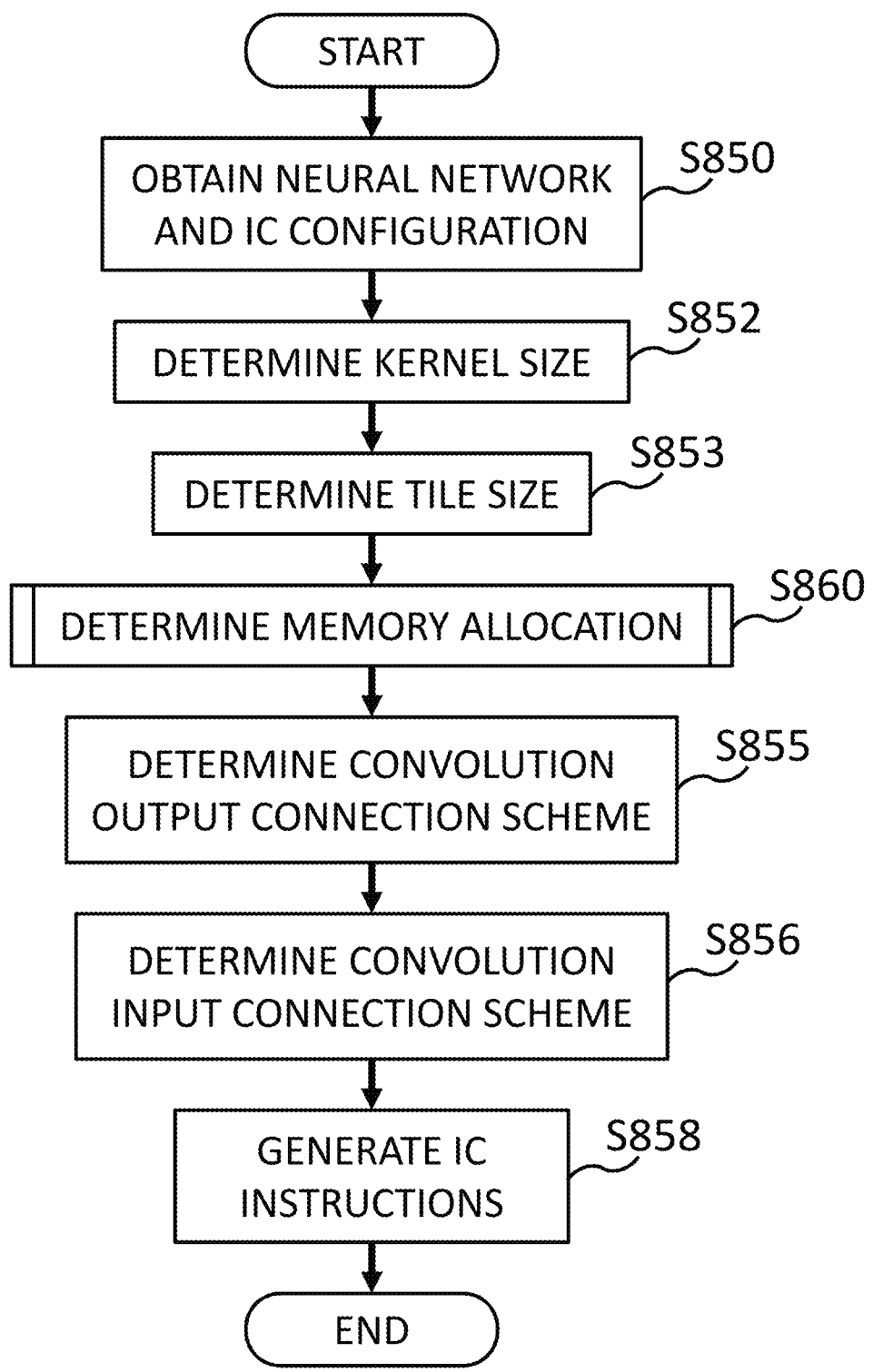
FIG. 8 shows an operational flow for configuring a device with accelerator run-time reconfigurability for inference, according to an embodiment of the present invention.

FIG. 8 shows an operational flow for configuring a device with accelerator run-time reconfigurability for inference, according to an embodiment of the present invention. The operational flow may provide a method for configuring a device with accelerator run-time reconfigurability for inference. The method may be performed by a host processor including sections for performing certain operations, such as the host processor shown in FIG. 12, which will be explained hereinafter. The method may also be performed by a processor separate from the host processor.

At S850, an obtaining section obtains a neural network and a configuration of an integrated circuit. The obtained configuration details the integrated circuit as including a plurality of convolution modules, a plurality of adder modules, an accumulation memory, and a convolution output interconnect control module configured to open and close convolution output interconnects among a plurality of convolution output interconnects connecting the plurality of convolution modules, the plurality of adder modules, and the accumulation memory. The neural network may have a plurality of layers, each layer having a plurality of nodes and a plurality of edges, and each node including a representation of a mathematical operation. The neural network may be obtained as a computational graph. The neural network may include a defined set of weight values. Alternatively, the obtaining section may obtain the weight values separately from the neural network.

At S852, a determining section determines the size of a kernel used for inference of the neural network. The determining section may determine other characteristics of the kernel, such as dilation, etc. Because these values are not configurable, and are part of the neural network configuration, they may be obtained as part of the neural network configuration, and the determining section may determine these characteristics by simply referring to the values in the neural network configuration obtained at S850.

At S853, the determining section determines a tile size suitable in order to use the integrated circuit to perform inference of the neural network. A tile is a portion of input data, and the size may be such that the integrated circuit has enough memory to compute an entire tile before accessing an external memory for more input data. The tile size may be determined by the capacity of the on-chip memory block(s) of the integrated circuit. The determining section may determine other characteristics based on the tile size, such as the number of tiles in each dimension, etc.

At S860, the determining section determines an allocation of the on-chip memory block(s) of the integrated circuit suitable in order to use the integrated circuit to perform inference of the neural network. If the integrate circuit has separate memory blocks having fixed lines of communication with the computational modules of the integrated circuit, then allocation options may be limited. However, if the integrated circuit has a single reconfigurable memory block, then there may be many allocation options.

At S855, the determining section determines at least one convolution output connection scheme for the integrated circuit to use during performance of inference. For example, the determining section may determine at least one convolution output connection scheme whereby each convolution module has no more than one open direct connection through the plurality of convolution output interconnects to an accumulation memory or one of a plurality of adder modules. The determining section may determine the at least one convolution output connection scheme based on the neural network and the configuration of the integrated circuit. The determining section may determine the at least one connection scheme further based on the tile size, the number of tiles in each dimension, and/or the number of convolution modules, in order to maximize convolution module utilization. The determining section may determine a single convolution output connection scheme for use during the entire inference process, or determine multiple convolution output connection schemes, one for each of several groups of layers of the neural network.

At S856, the determining section determines at least one convolution input connection scheme for the integrated circuit to use during performance of inference. For example, the determining section may determine at least one convolution input connection scheme whereby each convolution module has no more than one open direct connection through a plurality of convolution input interconnects to the input data memory or one of a plurality of indices included in a line buffer. The determining section may determine the at least one convolution input connection scheme further based on the kernel size, kernel dilation, and/or the number of convolution modules, in order to maximize convolution module utilization. The determining section may determine a single convolution input connection scheme for use during the entire inference process, or determine multiple convolution input connection schemes, one for each of several groups of layers of the neural network.

At S858, a generating section generates instructions for the integrated circuit to performance inference according to the kernel size, tile size, memory allocation, and schemes. For example, the generating section may generate integrated circuit instructions for the integrated circuit to perform inference of the neural network, the instructions including an instruction for a convolution output interconnect control module to configure a plurality of convolution output interconnects according to the at least one convolution output connection scheme. The generating section may also generate an instruction for a convolution input interconnect control module to configure a plurality of convolution input interconnects according to the at least one convolution input connection scheme. Generating instructions may also include compiling the instructions into a format executable by the integrated circuit to perform inference.

For devices having a single reconfigurable memory block, there may be many allocation options, which may be utilized in multi-precision support. Allocation of a single reconfigurable memory block may be particularly useful for devices having an interconnect between a load buffer and convolution modules, such as device 400 in FIG. 4. To allocate a single reconfigurable memory block, a memory bank width may be determined by the smallest data width that must be supported for performing inference of a given neural network. In some embodiments, this smallest data width is 8 bits, but the data width could be any power of 2. As an example, if the memory bank width is reduced to 2, then all multiples of 2 as bit widths can be supported, including any mix of them across layers of the neural network, although the computation modules, such as convolution modules, of the device may also require such multi-precision support in order to practically gain efficiency. A reconfigurable memory block may also allow inference of multiple neural networks in parallel.

Figure 9:
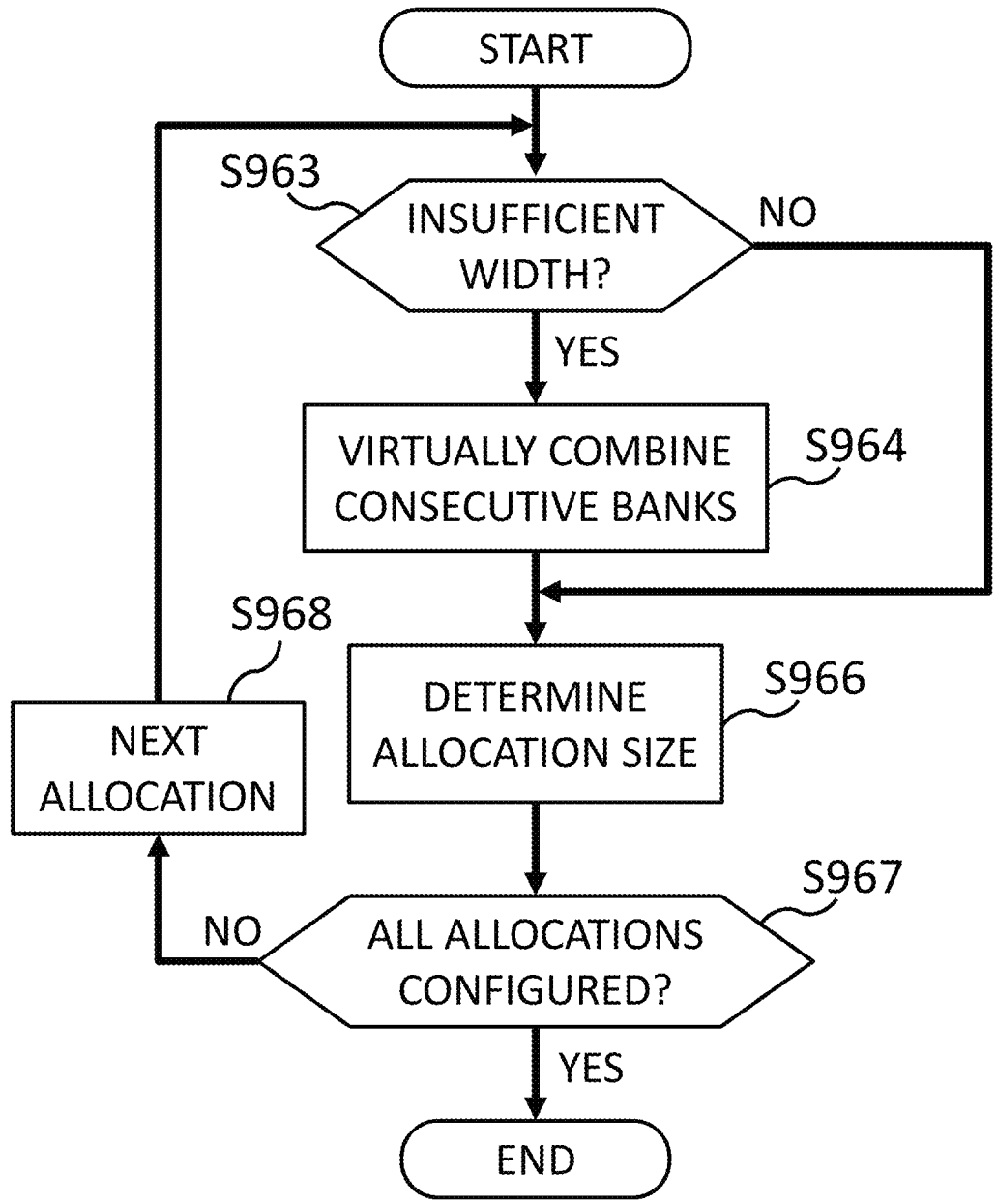
FIG. 9 shows an operational flow for determining an allocation of a reconfigurable memory for inference, according to an embodiment of the present invention.

FIG. 9 shows an operational flow for determining an allocation of a reconfigurable memory for inference, such as S860 of FIG. 8, according to an embodiment of the present invention. The operations within this operational flow may be performed by a determining section or a correspondingly named sub-section thereof.

At S963, the determining section or a sub-section thereof determines whether the physical memory bank width is sufficient for an allocation of memory. For example, the determining section may determine whether the memory bank width is sufficient for an input data memory allocation or for an accumulation memory allocation. If the bank width is sufficient, then the operational flow proceeds to S966 to determine the allocation. If the bank width is insufficient, then the operational flow proceeds to S964 to virtually combine consecutive banks. To support a memory bank width, the determined memory bank width must be the same size or a multiple of the physical bank width that is fixed and determined before manufacturing the writable memory block. If the memory bank width for an input data memory allocation or for an accumulation memory allocation is smaller than a physical bank width, then another writable memory block must be used in the integrated circuit.

At S964, the determining section or a sub-section thereof virtually combines consecutive banks to form virtual banks. For example, if the memory bank width determined at S962 is 8 bits, but an accumulation memory requires storage of 32-bit values, then the determining section will virtually combine 4 consecutive 8-bit banks to form one virtual 32-bit bank for the accumulation memory allocation. To utilize this, integrated circuit instructions, such as the integrated circuit instructions generated at S858 in FIG. 8, further include an instruction to allocate the writable memory block for the accumulation memory allocation such that each bank of the accumulation memory allocation is a virtual combination of consecutive banks of the writable memory block.

At S966, the determining section or a sub-section thereof determines a size of a memory allocation. For example, the determining section may determine a memory allocation size based on required capacity, which may be based on tile size, value size, number of values, total capacity of the writable memory block, type and degree of parallelism, etc.

At S967, the determining section or a sub-section thereof determines whether all allocations of memory have been configured. If there are remaining memory allocations that need to be configured, then the operational flow selects the next allocation (S968) before proceeding to another iteration of S963. If there are no unconfigured memory allocations, then the operational flow ends. To implement the memory allocations of an accumulation memory and an input data memory, integrated circuit instructions, such as the integrated circuit instructions generated at S858 in FIG. 8, further include an instruction to allocate the writable memory block for the accumulation memory allocation and an input data memory allocation.

Although in the foregoing embodiment the size of each allocation is determined one at a time, in some embodiments the size of all allocations is determined together. In other embodiments, multiple allocations of memory are determined for inference, such as an allocation for each of multiple groups of layers of the neural network.

Once the instructions are generated and compiled, these instructions are transferred to the integrated circuit. Based on the configuration in the instructions, a "setup" step may cause the integrated circuit, or an interconnect control module thereof, to configure the individual interconnects of an interconnect using signals associated for all convolution module in a "circuit-switched" manner. The "setup" step may further cause the integrated circuit, or a memory control module, to configure memory banking and connectivity for all convolution modules, and set memory locks. Once the "setup" step is complete, the instructions may cause the integrated circuit to execute the inference operation. Once the inference operation, or a portion thereof defined by groups of layers, is complete, then all resources will be released and ready for another "setup" step.

Figure 10:
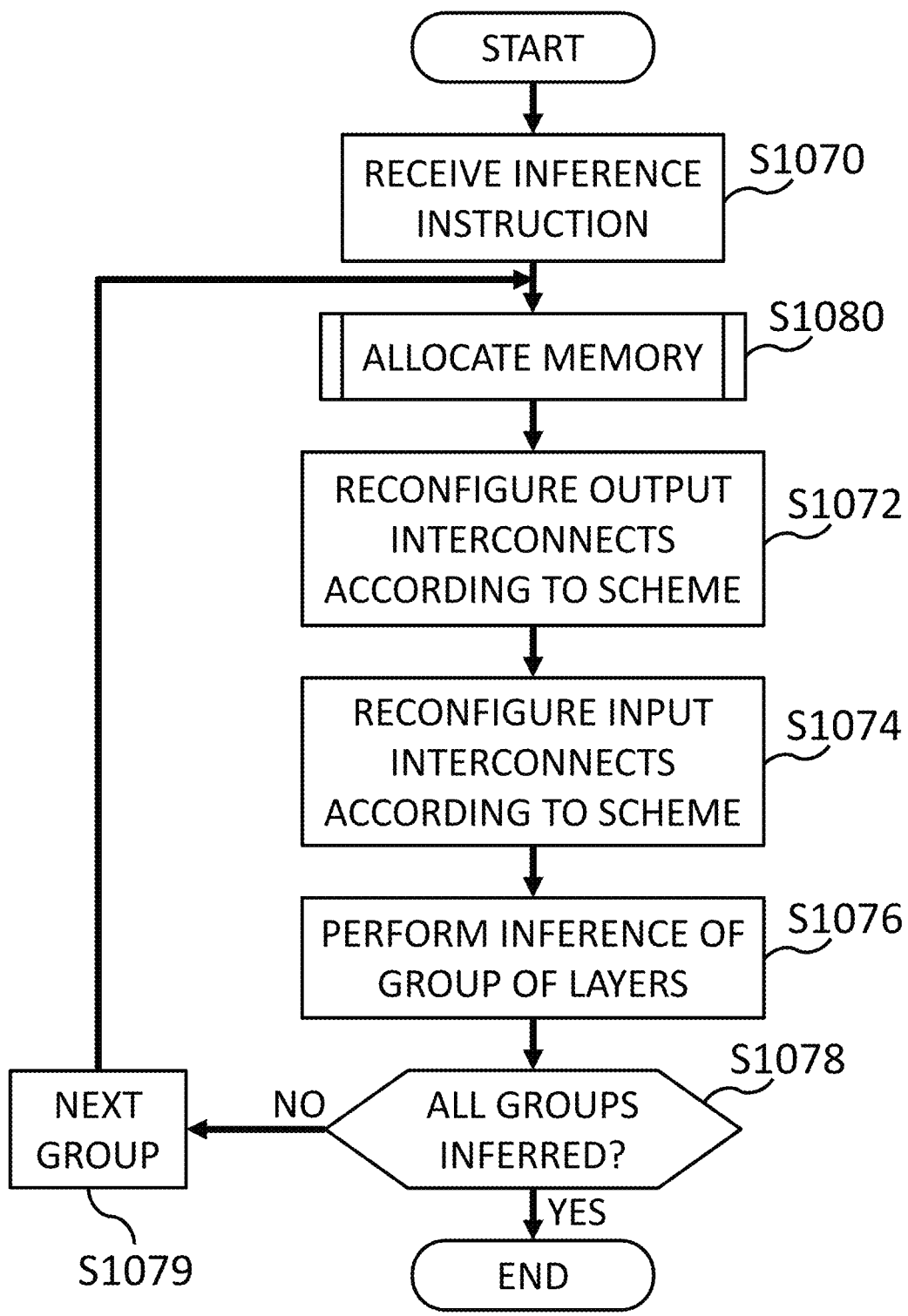
FIG. 10 shows an operational flow for reconfiguring a device with accelerator run-time reconfigurability while performing inference, according to an embodiment of the present invention.

FIG. 10 shows an operational flow for reconfiguring a device with accelerator run-time reconfigurability while performing inference, according to an embodiment of the present invention. The operational flow may provide a method for reconfiguring a device with accelerator run-time reconfigurability while performing inference. The method may be performed by an integrated circuit including sections for performing certain operations, such as the integrated circuit shown in FIG. 12, which will be explained hereinafter.

At S1070, a receiving section receives an instruction to perform inference of a neural network. The instruction may include instructions for reconfiguring an interconnect or writable memory block of the integrated circuit, such as the instructions generated at S858 in FIG. 8.

At S1080, an allocating section allocates a writable memory block of the integrated circuit. For example, the allocating section may allocate a writable memory block such that the accumulation memory is as an accumulation memory allocation of the writable memory block.

At S1072, a reconfiguring section reconfigures a convolution output reduction interconnect of the integrated circuit. For example, the reconfiguring section may configure a plurality of convolution output interconnects according to at least one convolution output connection scheme whereby each convolution module among a plurality of convolution modules has no more than one open direct connection through the plurality of convolution output interconnects to an accumulation memory or one of a plurality of adder modules. The reconfiguring section may include a control module, such as control module 114 of FIG. 1.

At S1074, the reconfiguring section reconfigures a convolution input interconnect of the integrated circuit. For example, the reconfiguring section may configure a plurality of convolution input interconnects according to at least one convolution input connection scheme whereby each convolution module has no more than one open direct connection through the plurality of convolution input interconnects to an input data memory or one of a plurality of indices included in a line buffer. The reconfiguring section may also include a control module such as control module 444 of FIG. 4.

At S1076, an inference section causes the integrated circuit to perform inference of the neural network. For example, the inference section may coordinate read modules, convolution modules, adder modules, write modules, etc., to read and process input data into output data in accordance with the neural network. The input data may be read from an external memory and processed in portions, such as tiles, and then the output data may be written to the external memory. Because the integrated circuit is reconfigurable, the instructions may cause performance of inference according to the current configuration for only a group of layers, but not all layers of the neural network. The instructions may cause performance of inference of other groups of layers according to other configurations.

At S1078, the reconfiguring section determines whether all groups of layers have been inferred. If there are remaining groups of layers that need to be inferred, then the operational flow selects the next group of layers (S1079) before proceeding to another iteration of S1080, where reconfiguration of the integrated circuit for the next group begins. If all groups of layers have been inferred, then the operational flow ends. If all layers are inferred under the same configuration, then the instructions may treat all layers as belonging to a single group.

Figure 11:
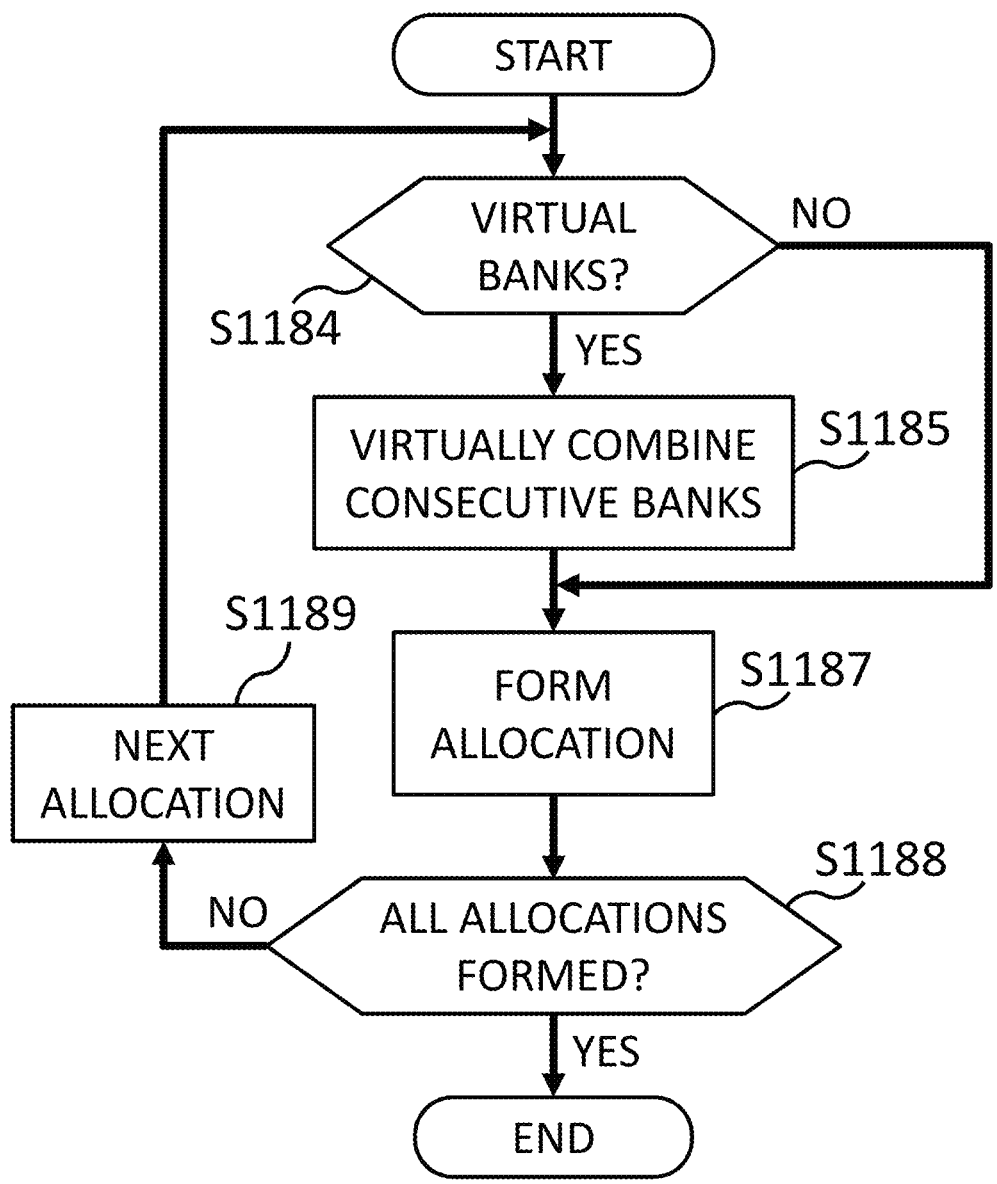
FIG. 11 shows an operational flow for reconfiguring a device with a reconfigurable memory while performing inference, according to an embodiment of the present invention.

FIG. 11 shows an operational flow for reconfiguring a device with a reconfigurable memory while performing inference, such as S1080 of FIG. 10, according to an embodiment of the present invention. The operations within this operational flow may be performed by an allocating section or a correspondingly named sub-section thereof.

At S1184, the allocating section or a sub-section thereof determines whether the configuration includes virtual banks for a memory allocation. If the memory allocation includes virtual banks, then the operational flow proceeds to S1185 to lock consecutive banks. If the memory allocation does not include virtual banks, then the operational flow proceeds to S1187 to form the memory allocation.

At S1185, the allocating section or a sub-section thereof locks consecutive banks to form virtual banks. For example, if the memory bank width configured at S1182 is 8 bits, but an accumulation memory requires storage of 32-bit values, then the allocating section will lock 4 consecutive 8-bit banks to form one virtual 32-bit bank for the accumulation memory allocation.

At S1187, the allocating section or a sub-section thereof forms the memory allocation according to the size in the configuration. For example, the allocating section may designate a certain number of memory banks that amount to the specified size of the memory allocation in such a way that it is indicated to at least the modules that may record to the memory allocation. For example, the allocating section may allocate the writable memory block such that the accumulation memory is as an accumulation memory allocation of the writable memory block. If the allocating section has virtual banks, then the allocating section allocates the writable memory block for the accumulation memory allocation such that each bank of the accumulation memory allocation is a virtual combination of consecutive banks of the writable memory block.

At S1188, the allocating section or a sub-section thereof determines whether all allocations of memory have been formed. If there are remaining memory allocations that need to be formed, then the operational flow selects the next allocation (S1189) before proceeding to another iteration of S1184. If there are no unformed memory allocations, then the operational flow ends.

Figure 12:
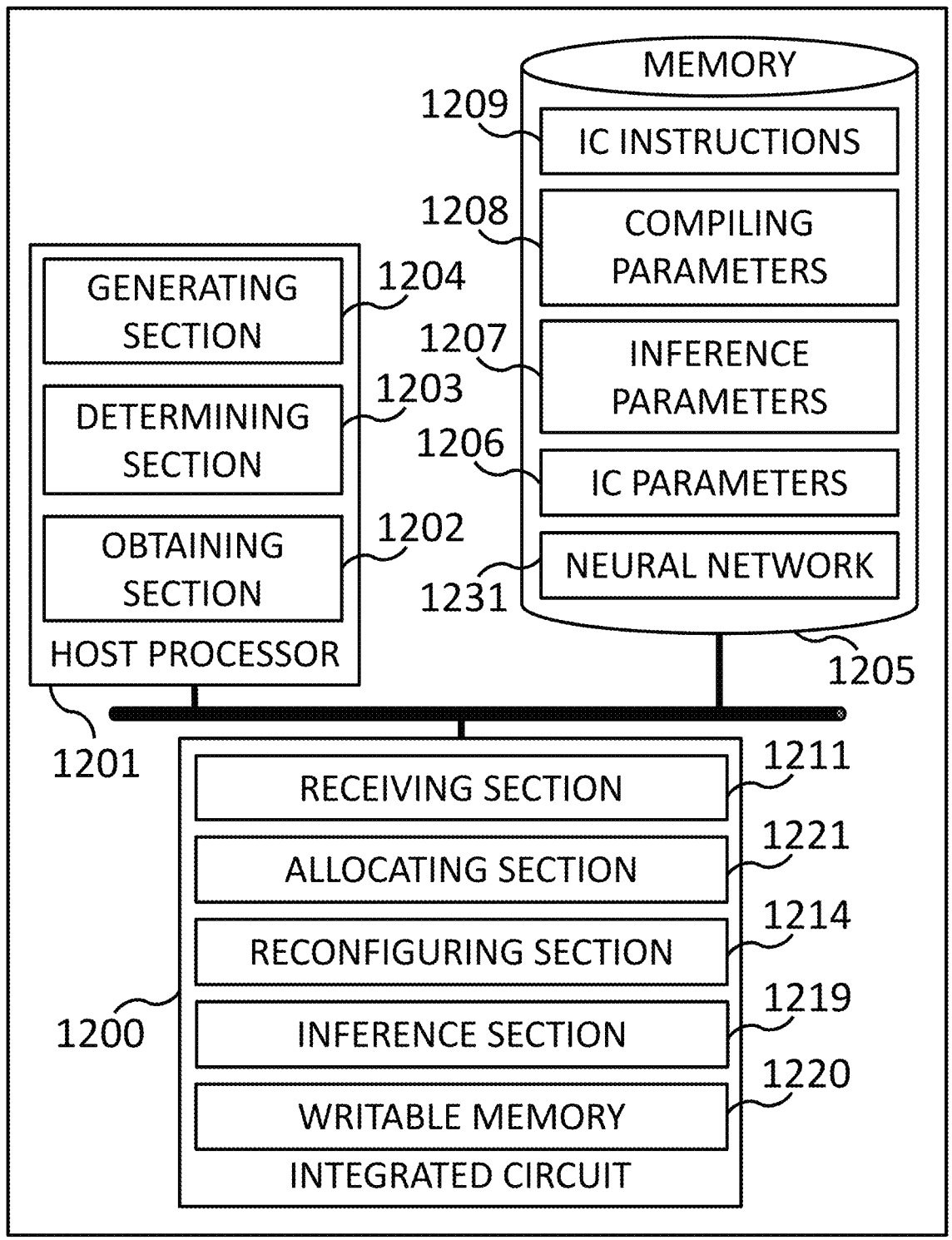
FIG. 12 shows a hardware configuration for configuration and performance of inference using accelerator run-time reconfigurability, according to an embodiment of the present invention.

FIG. 12 shows a hardware configuration for configuration and performance of inference using accelerator run-time reconfigurability, according to an embodiment of the present invention. The exemplary hardware configuration includes host processor 1201, which communicates with external memory 1205 and integrated circuit 1200. Host processor 1201, external memory 1205, and integrated circuit 1200 may be part of a host computer such as a server computer or a mainframe computer that executes an on-premise application and hosts client computers that use it. Host processor 1201, external memory 1205, and integrated circuit 1200 may be part of a personal computer, mobile computer, or small-scale computing device that executes an application for a user.

In this embodiment, host processor 1201 can be thought of as a logic section, such as a computer program product including one or more computer readable storage mediums collectively storing program instructions that are executable by a processor or programmable circuitry to cause the processor or programmable circuitry to perform the operations of the various sections. Host processor 1201 may alternatively be analog or digital programmable circuitry, or any combination thereof. Host processor 1201 may be composed of physically separated storage or circuitry that interacts through communication. External memory 1205 may be a volatile or non-volatile computer-readable medium capable of storing data for access by host processor 1201 during performance of the processes herein. Integrated circuit 1200 may be an accelerator capable of performing neural architecture inference and reconfiguration, such as device 100 in FIG. 1, device 300 in FIG. 3, or device 400 in FIG. 4.

Host processor 1201 includes obtaining section 1202, determining section 1203, and generating section 1204. External memory 1205 includes neural network 1231, integrated circuit parameters 1206, inference parameters 1207, compiling parameters 1208, and integrated circuit instructions 1209.

Obtaining section 1202 is the portion of host processor 1201 that obtains information for configuration and performance of neural network inference. For example, obtaining section 1202 may be configured to obtain a neural network and an integrated circuit configuration. Obtaining section 1202 may store obtained information in external memory 1205 as neural network 1231 and integrated circuit parameters 1206. Obtaining section 1202 may include sub-sections for performing additional functions, as described in the foregoing flow charts. Such sub-sections may be referred to by a name associated with their function.

Determining section 1203 is the portion of host processor 1201 that makes various determinations for configuration and performance of neural network inference, such as connection schemes, memory allocation, tile size, kernel properties, etc. While determining, determining section 1203 may access neural network 1231, integrated circuit parameters 1206, and inference parameters 1207. Determining section 1203 may include sub-sections for performing additional functions, as described in the foregoing flow charts. Such sub-sections may be referred to by a name associated with their function.

Generating section 1204 is the portion of host processor 1201 that generates and compiles instructions for integrated circuit 1200 to execute to perform neural network inference. While generating and compiling instructions, generating section 1204 may access neural network 1231, integrated circuit parameters 1206, inference parameters 1207, compiling parameters 1208, and integrated circuit instructions 1209. Generating section 1204 may include sub-sections for performing additional functions, as described in the foregoing flow charts. Such sub-sections may be referred to by a name associated with their function.

Integrated circuit 1200 includes receiving section 1211, allocating section 1221, reconfiguring section 1214, inference section 1219, and writable memory 1220.

Receiving section 1211 is the portion of integrated circuit 1200 that receives instructions, such as instructions to perform neural network inference. While receiving instructions, receiving section 1211 may access integrated circuit instructions 1209, or may receive instructions directly from generating section 1204. Receiving section 1211 may store instructions in writable memory 1220. Receiving section 1211 may include sub-sections for performing additional functions, as described in the foregoing flow charts. Such sub-sections may be referred to by a name associated with their function.

Allocating section 1221 is the portion of integrated circuit 1200 that allocates writable memory 1220 according to integrated circuit instructions 1209. For example, allocating section 1221 may allocate writable memory 1220 to include an accumulation memory allocation and/or an input data memory allocation. Allocating section 1221 may include sub-sections for performing additional functions, as described in the foregoing flow charts. Such sub-sections may be referred to by a name associated with their function.

Reconfiguring section 1214 is the portion of integrated circuit 1200 that reconfigures integrated circuit 1200 for inference of at least a group of layers of a neural network. For example, reconfiguring section 1214 may reconfigure output interconnects and/or input interconnects according to a scheme. Reconfiguring section 1214 may include sub-sections for performing additional functions, as described in the foregoing flow charts. Such sub-sections may be referred to by a name associated with their function.

Inference section 1219 is the portion of integrated circuit 1200 that causes the integrated circuit to perform inference of the neural network. For example, inference section 1219 may coordinate read modules, convolution modules, adder modules, write modules, etc., to read and process input data into output data in accordance with the neural network. Inference section 1219 may access neural network 1231 of external memory 1205 to read input data. Inference section 1219 may include sub-sections for performing additional functions, as described in the foregoing flow charts. Such sub-sections may be referred to by a name associated with their function.

Writable memory 1220 may be a computer-readable medium, such as RAM, flash memory, or other embedded writable memory, capable of storing data for access by receiving section 1211, allocating section 1221, reconfiguring section 1214, and inference section 1219 during execution of neural network inference. Writable memory 1220 may be a composition of separate memory blocks, or may be a composition of any number of reconfigurable memory blocks, or any mix of them.

In other embodiments, a host processor responsible for generating instructions and compilation can be separate from a host processor that sends the instructions to the integrated circuit.

In the foregoing embodiment, a single external memory is shared by the host processor and the integrated circuit, and is directly connected to both. In other embodiments, the host processor has its own separate external memory. In such embodiments, instructions and configuration will be passed from the host external memory to the device external memory through a bus. Embodiments such as FIG. 12, where the host external memory and device external memory are the same physical memory, may be implemented using shared-memory SoC boards.

In the foregoing embodiment, the receiving section stores instructions in the writable memory. In other embodiments, instructions stored in the external memory, such as DDR, are later loaded into on-chip FIFO queues. The receiving section may include a dedicated instruction fetching module which loads instructions from external DDR memory, and stores them into FIFOs as instructions are consumed by other modules.

In other embodiments, the host processor may be any other device capable of processing logical functions in order to perform the processes herein. The external memory may be one or more computer-readable mediums. For example, the host processor may be a central processing unit (CPU) and the external memory may be a dynamic random access memory (DRAM), in which the computer-executable instructions may be copied in whole or in part for execution by the CPU during performance of the processes herein.

In embodiments where the apparatus is a computer, a program that is installed in the computer can cause the computer to function as or perform operations associated with apparatuses of the embodiments of the present invention or one or more sections (including modules, components, elements, etc.) thereof, and/or cause the computer to perform processes of the embodiments of the present invention or steps thereof. Such a program may be executed by a processor to cause the computer to perform certain operations associated with some or all of the blocks of flowcharts and block diagrams described herein.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An integrated circuit comprising:
   an accumulation memory;
   a plurality of convolution modules comprising circuitry configured to perform mathematical operations on input values;
   a plurality of adder modules comprising circuitry configured to sum values output from the plurality of convolution modules; and
   a plurality of convolution output interconnects connecting the plurality of convolution modules, the plurality of adder modules, and the accumulation memory;
   wherein the accumulation memory is an accumulation memory allocation of a writable memory block having a reconfigurable bank width; and
   wherein each bank of the accumulation memory allocation is a virtual combination of consecutive banks of the writable memory block.

2. The integrated circuit according to claim 1, further comprising:
   a convolution output interconnect control module configured to open and close convolution output interconnects according to a convolution output connection scheme;
   wherein each convolution module has a direct connection to each adder module and the accumulation memory, and each adder module has a direct connection to the accumulation memory; and
   wherein, in accordance with the convolution output scheme, each convolution module has no more than one open direct connection through the plurality of convolution output interconnects to the accumulation memory or one of the plurality of adder modules.

3. The integrated circuit according to claim 2, wherein the convolution output connection scheme includes more than one convolution module among the plurality of convolution modules having an open direct connection to a common adder module among the plurality of adder modules.

4. The integrated circuit according to claim 1, further comprising:
   one or more sequencer modules configured to synchronize the operations of the plurality of convolution modules.

5. The integrated circuit according to claim 1, further comprising:
   an input data memory, the input data memory allocation storing the input values;
   wherein the input data memory is an input data memory allocation of the writable memory block; and
   wherein each bank of the input data memory allocation is a virtual combination of consecutive banks of the writable memory block.

6. The integrated circuit according to claim 5, further comprising
   a line buffer in communication with the input data memory and the plurality of convolution modules, the line buffer including a plurality of indices; and
   a plurality of convolution input interconnects connecting the plurality of indices, the plurality of convolution modules, and the input data memory, such that each convolution module has a direct connection to each index and the input data memory; and
   a convolution input interconnect control module configured to open and close convolution input interconnects according to a convolution input connection scheme whereby each convolution module has no more than one open direct connection through the plurality of convolution input interconnects to the input data memory or one of the plurality of indices.

7. The integrated circuit according to claim 1, further comprising:
   an input data memory, the input data memory allocation storing the input values;
   wherein the input data memory is an input data memory allocation of the writable memory block; and
   wherein each bank of the input data memory allocation is a bank of the writable memory block.

8. The integrated circuit according to claim 7, wherein the writable memory block has a bank width of 8 bits;
   each bank of the input data memory allocation is a 8-bit bank of the writable memory block; and
   each bank of the accumulation memory allocation is a 32-bit virtual combination of four consecutive 8-bit banks of the writable memory block.

9. The integrated circuit according to claim 1, wherein each bank of the accumulation memory allocation is a virtual combination of a first number of consecutive banks of the writable memory block.

10. The integrated circuit according to claim 9, further comprising:
    a processor configured to
        receive an instruction for reconfiguring the writable memory block, and
        reconfigure the accumulation memory allocation according to the instruction so that each bank of the accumulation memory allocation is a virtual combination of a second number of consecutive banks of the writable memory block.

* * * * *